United States Patent
Verge

(10) Patent No.: US 10,216,822 B2
(45) Date of Patent: Feb. 26, 2019

(54) DATA DISTRIBUTION METHODS AND SYSTEMS

(71) Applicant: VOD2, INC., Montreal, Quebec (CA)

(72) Inventor: Rene Verge, Montreal (CA)

(73) Assignee: VOD2, INC., Montreal (CA)

( * ) Notice: Subject to any disclaimer, the term of this patent is extended or adjusted under 35 U.S.C. 154(b) by 656 days.

(21) Appl. No.: 14/440,174

(22) PCT Filed: Nov. 1, 2013

(86) PCT No.: PCT/CA2013/000927
§ 371 (c)(1),
(2) Date: May 1, 2015

(87) PCT Pub. No.: WO2014/066986
PCT Pub. Date: May 8, 2014

(65) Prior Publication Data
US 2015/0293986 A1    Oct. 15, 2015

Related U.S. Application Data

(60) Provisional application No. 61/722,025, filed on Nov. 2, 2012.

(51) Int. Cl.
*G06F 17/30* (2006.01)
*G06F 21/62* (2013.01)
*H04L 9/08* (2006.01)

(52) U.S. Cl.
CPC .. *G06F 17/30584* (2013.01); *G06F 17/30135* (2013.01); *G06F 17/30194* (2013.01); *G06F 21/62* (2013.01); *H04L 9/085* (2013.01)

(58) Field of Classification Search
CPC .............. G06F 17/30584; G06F 17/30135
USPC .............................................. 707/821
See application file for complete search history.

(56) References Cited

U.S. PATENT DOCUMENTS 4,012,132 A * 3/1977 Lazarus ............... G03B 21/116
                                                353/25
4,185,269 A * 1/1980 Hodges ................ H03M 13/13
                                                714/762
5,694,425 A * 12/1997 Suganuma ............ H04L 27/00
                                                370/522

(Continued)

*Primary Examiner* — Pierre M Vital
*Assistant Examiner* — Nargis Sultana
(74) *Attorney, Agent, or Firm* — Robert Brouillette; Brouillette Legal Inc.

(57) ABSTRACT

Methods and related systems for secured and distributed data storage and communication are disclosed. For each byte of a given data set or file, data is split at the bit level and reassembled into a given number of meaningless data sets or files. One or more parity files are also generated to ensure availability and integrity of the data at all times. Each file is sent to a different and typically geographically distinct data storage location. When the information is required, the reverse process takes place. The only place where the information is reconstructed and accessible is at the point where it is required (the authorized users' computing devices or the organization's network reassembly point). The source information is never stored or accessible in any single storage location, making it highly secured. The process can be embodied into a system through various forms, including software, firmware, hardware or combination thereof.

4 Claims, 7 Drawing Sheets

(56) References Cited

U.S. PATENT DOCUMENTS

| | | | | |
|---|---|---|---|---|
| 2001/0056543 | A1* | 12/2001 | Isomura | G06F 21/86 726/36 |
| 2002/0150244 | A1* | 10/2002 | Kim | H04N 5/913 380/201 |
| 2003/0097640 | A1* | 5/2003 | Abrams | G06F 17/241 715/255 |
| 2004/0098408 | A1* | 5/2004 | Gensel | G06F 8/20 |
| 2005/0209785 | A1* | 9/2005 | Wells | G16H 50/20 702/19 |
| 2008/0162603 | A1* | 7/2008 | Garg | G06F 17/218 |
| 2010/0098289 | A1* | 4/2010 | Tognoli | A61B 5/0476 382/100 |
| 2010/0281230 | A1* | 11/2010 | Rabii | G06F 3/0605 711/165 |
| 2011/0145638 | A1* | 6/2011 | Syrgabekov | H04L 1/0041 714/20 |
| 2011/0286594 | A1* | 11/2011 | Resch | H04L 9/085 380/46 |
| 2013/0067174 | A1* | 3/2013 | Moss | G06F 11/1076 711/154 |

* cited by examiner

DATA DISTRIBUTION METHODS AND SYSTEMS

CROSS-REFERENCE TO RELATED APPLICATIONS

The present patent application claims the benefits of priority of U.S. Provisional Patent Application No. 61/722,025, entitled "Virtual Online Data Distribution System and Method", and filed at the United States Patent and Trademark Office on Nov. 2, 2012, the content of which is incorporated herein by reference.

FIELD OF THE INVENTION

The present invention generally relates to secure and distributed data storage and communication.

BACKGROUND OF THE INVENTION

The generally accepted practice in the information technology and communication industry is to store information (data) with one service provider, in one physical and geographical location. Often, the service provider will also provide redundancy and backup storage in remote locations, but this is only to ensure performance and the availability of data in case of disaster or other failures. Information (data) is still entrusted to this single service provider, which must implement a plethora of security measures to ensure the protection of the information, namely its confidentiality, integrity and availability. These measures can be preventive, detective or corrective in nature and include, but are not limited to, physical and logical access controls, data encryption at rest and in transit, backups, monitoring, alerting, journalising, antivirus, firewalls, intrusion detection and prevention systems, physical and environmental protection measures, security policies, procedures and standards, background checks, security awareness programs, audit plans and certification, incident response, breach notification, risk assessments, etc.

In the end, with all these security measures implemented, information (data) can still be vulnerable and the user or the organisation is never completely sure that the information is adequately secured. Encryption, which is often specifically used to secure the confidentiality of data at rest and in transit, is itself vulnerable. Encryption can be poorly implemented, it can contain backdoors unknown to the user or data owner, and the keys themselves can be handed to third parties, without the knowledge or consent of the user or the data owner.

The vast majority of service providers will themselves entrust their client's information to other suppliers or give them access to the information, often without the user's or organisation's knowledge or consent. Suppliers of the service provider will often themselves entrust information to other supplier or give them access to the information. It is most often unlikely that the same level of information protection will be guaranteed in these downstream subcontracting scenarios.

Current information storage and communication practices are also affected by the global legal and regulatory landscape. Each country or jurisdiction or even industry may have specific laws and regulations applicable to information that is stored, communicated or processed in its territory. Certain laws or regulations will give wide powers to monitor, intercept or access information often without the user's or organisation's consent or knowledge. This situation can often result in security, confidentiality and privacy issues. Furthermore, the legal and regulatory differences in various jurisdictions can often discourage the free flow of information towards the most efficient and appropriate storage, processing and communication service providers.

In view of the foregoing, there is a need for a different way to store information (data) securely while at least mitigating the limitations and shortcomings of the current practice.

SUMMARY OF THE INVENTION

The shortcomings of the prior art data storage practice are at least mitigated by methods and related systems which enable secure and distributed data storage and communication. By secure, it is understood that it can ensure the "confidentiality, integrity and availability" of data. By distributed, it is understood that the information can be communicated and stored in various locations, either locally, on a local workstation, server, USB device or any other storage device, on an Intranet, on the Internet, or a combination thereof, including what is often referred to as the "cloud", to emphasize the fact that data can be communicated, stored and processed in locations that are not necessarily known to the user or the organisation using the services.

The method in accordance with the principles of the present invention radically changes the generally accepted practice and paradigm that consists in storing information in one physical and geographical location or with one specific service provider. In its most basic form, the method in accordance with the principles of the present invention splits the source data (e.g. computer file) at the bit level, typically for each byte, into a specific number of parts and sends each of these parts to a different location (datacenter, network location, workstation, local server, USB storage, etc.), subject to the user's or organisation's requirements. The information is never stored in one single location and, since each part is arranged in a way that makes it meaningless, the service provider or anyone else targeting a storage location can never have access to the source information.

When the source data is required, the method is performed in reverse order. It will fetch each part of the data from the various locations and reassemble them at the bit level, typically for each byte, to produce the source data. The only place where the information is fully accessible and readable is at the point where it is required (the user's computing device or the organisation's network reassembly point).

Since one or more of the parts generated is made up of parity data from the other parts, availability of the source data is generally always insured in the event that one or more locations become unavailable. Since no single location has access to the information and since no location is "essential" to the availability and integrity of the information, it is no longer necessary to implement all the security measures generally required to ensure a high level of information security.

In summary, by changing the current practice and paradigm for information storage, communication and processing, the method and related system in accordance with the principles of the present invention provide a high level of information security (e.g. confidentiality, integrity and availability) at a minimal cost, by making information available only where it is required and generally nowhere else.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Novel methods and related systems for partitioning and storing data will be described hereinafter. Although the invention is described in terms of specific illustrative embodiments, it is to be understood that the embodiments described herein are by way of example only and that the scope of the invention is not intended to be limited thereby.

Figure 1:
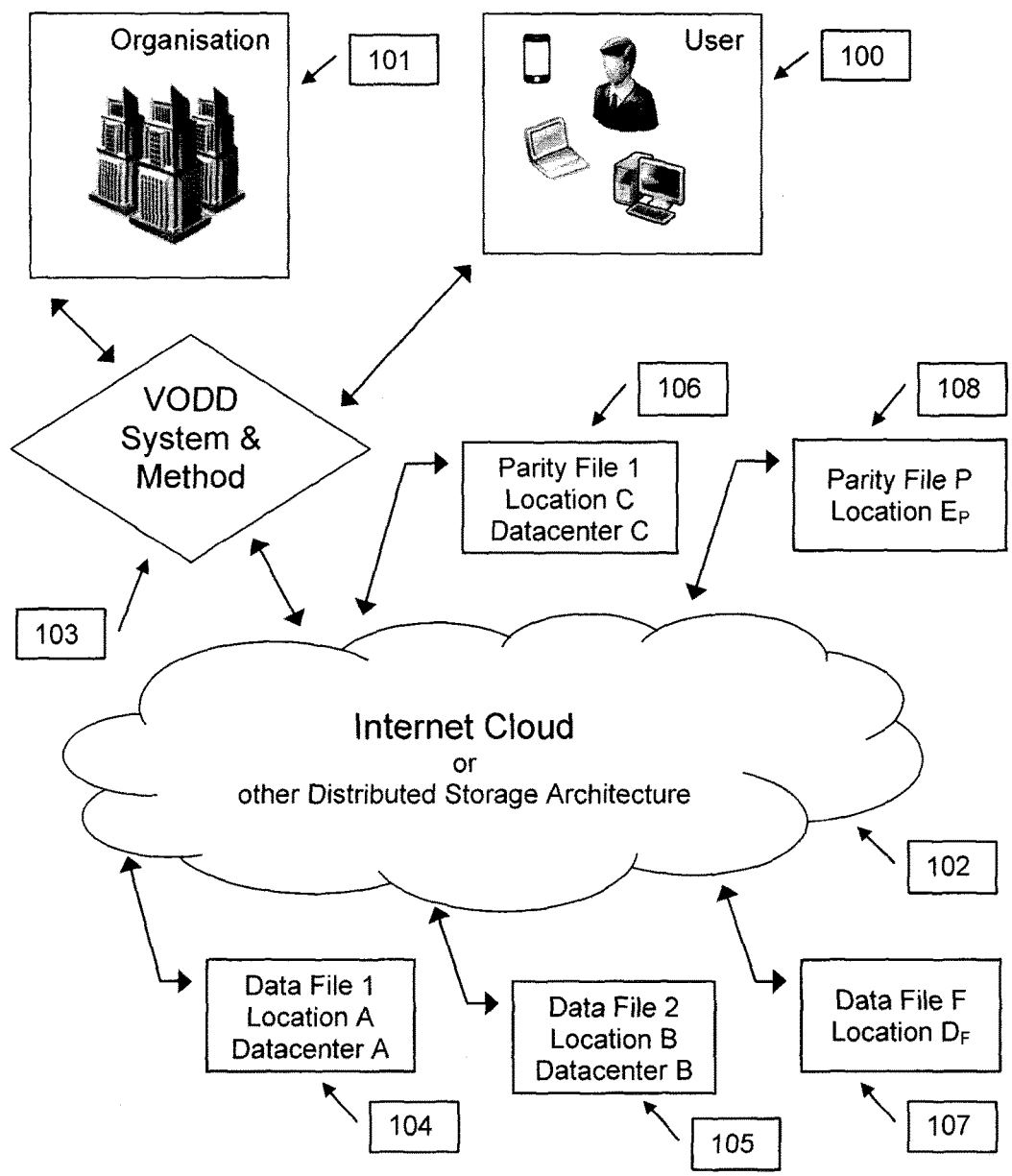
FIG. 1 is a high level network architectural diagram, in accordance with the principles of the present invention, showing the relationship between the user (or the organisation) producing the source data, the method and the resulting data files and parity file(s) stored in different locations in the cloud or other distributed storage architecture.

FIG. 1 is a high level network architectural diagram, in accordance with the principles of the present invention, showing the relationship between the User (100), or the Organisation (101), producing the source data which is processed by the system and method (103), and the resulting data files (104 to 107) and parity file(s) (106 and 108) stored in different geographical locations in the cloud or other distributed storage architecture (102). The embodiment shown uses the Internet Cloud infrastructure, but any other form of distributed storage architecture could be used, for example an Intranet, local workstations, servers, USB devices, datacenter or any other storage devices, locations or combination thereof.

The present method can be embodied into a system through various forms, including software, firmware, hardware or a combination thereof. In FIG. 1, the method is embodied into a software application (e.g. a computer-implemented method) that resides on the user's computing device (100 and 103) (e.g. computer, tablet, smartphone, etc.) or in a network appliance that resides on the organisation's network (101 and 103) (e.g. computer, server, tablet, smartphone, etc.).

In the most basic embodiment, the source data produced by the User (100), or the Organisation (101), is split into two parts called slices and then converted into files. Data File 1 is stored in Location A, Datacenter A (104) and Data File 2 is stored in Location B, Datacenter B (105). The parity information of Data Slice 1 and Data Slice 2 is converted to Parity File 1 and stored in Location C, Datacenter C (106). In a more robust embodiment, where more than 2 Data Files and/or more than one Parity File are required and produced, Data File F would be stored in Location DF (107) and Parity File P would be stored in Location EP (108). It is important to note that in all embodiments, no single storage device, datacenter or location has access to the source data, since each Data File and Parity File is made up of meaningless data.

The location (e.g. URL) of the various storage locations are kept in the VODD system (103), along with the access and authentication credentials.

Figure 2:
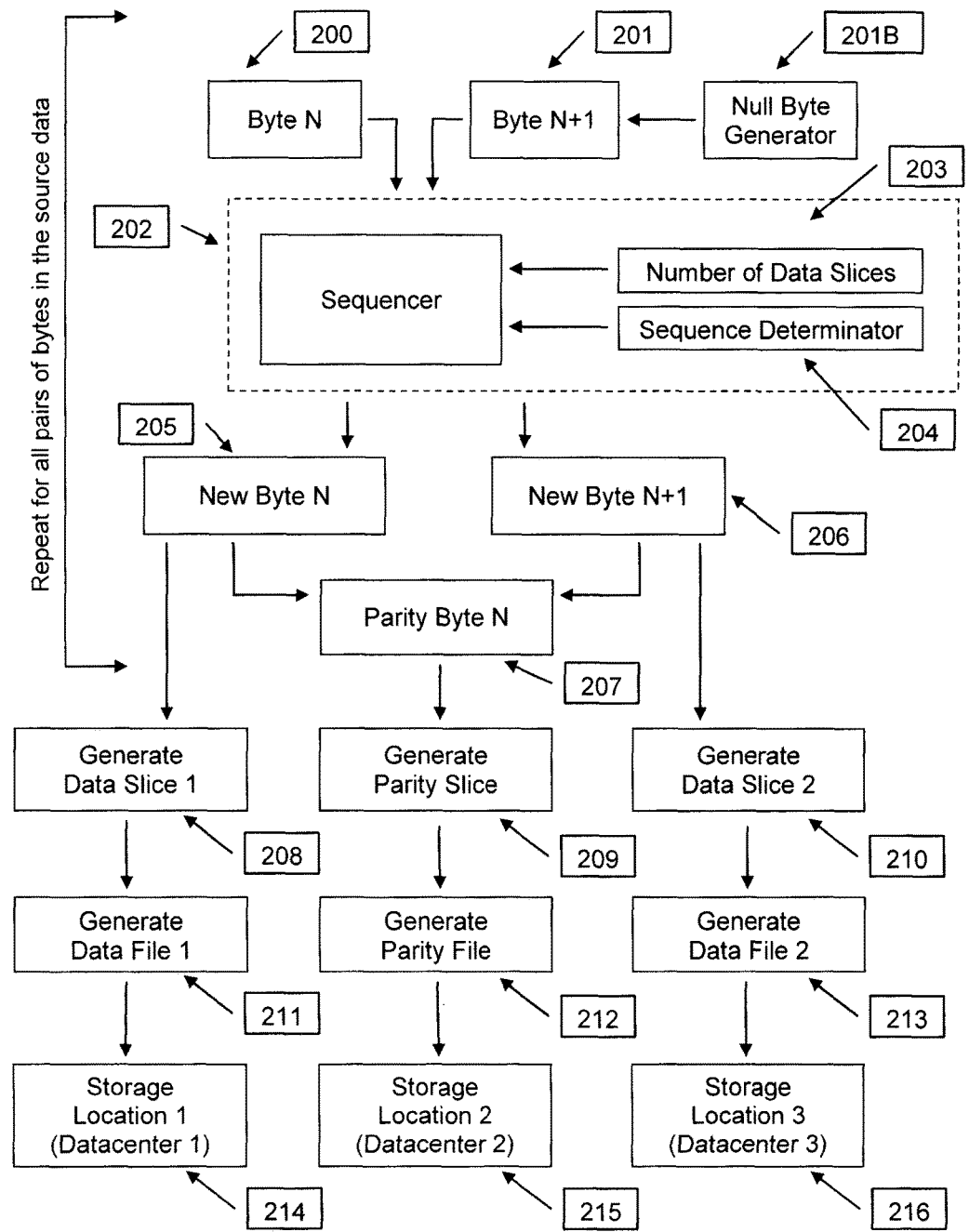
FIG. 2 is a diagram showing an embodiment of a method in accordance with the principles of the present invention for fragmenting source data bytes to form new bytes, generate parity bytes, produce data slices, convert them to files and sent these files to different storage locations.

FIG. 2 is a diagram showing an embodiment of the method for fragmenting source data bytes to form new bytes (200 to 206), generate parity bytes (207), produce data slices (208 to 210), convert them to files (211 to 213) and sent these files to different storage locations (214 to 216).

In the most basic embodiment, byte N (200) and byte N+1 (201) of the source data are fragmented following a predetermined bit sequence (202). This sequence is determined by the number of Data Slices required (203) and a sequencing order (204). Depending on the fragmenting and sequencing process used, one or more Null Bytes may need to be added to the source data (201B). This will be more apparent in the specific embodiments of the fragmenting and sequencing process explained in more details in FIGS. 5, 6 and 7. From this fragmenting and sequencing process, a new byte N is generated (205) and a new byte N+1 is generated (206). A parity byte N is also generated (207) by performing a logical XOR on new byte N (205) and new byte N+1 (206). This fragmenting and sequencing process (200 to 207) is performed for all pairs of bytes in the source data.

As the fragmenting process takes place (200 to 207), two Data Slices (208 & 210) and a Parity Slice (209) are produced. When the fragmenting process (200 to 207) is complete for all pairs of bytes in the source data, each slice is converted to a meaningless file that can be recognized by the file system (211 to 213). Finally, each file is sent to a different storage location (214 to 216).

This embodiment demonstrates the use of 3 storage locations, in this instance 3 datacenters (two for the Data Files and one for the Parity File), but other embodiments are also possible, using more than 3 locations (e.g. more than 2 Data File locations and/or more than one Parity File locations). These embodiments are shown in more details in FIGS. 5, 6 and 7.

Figure 3:
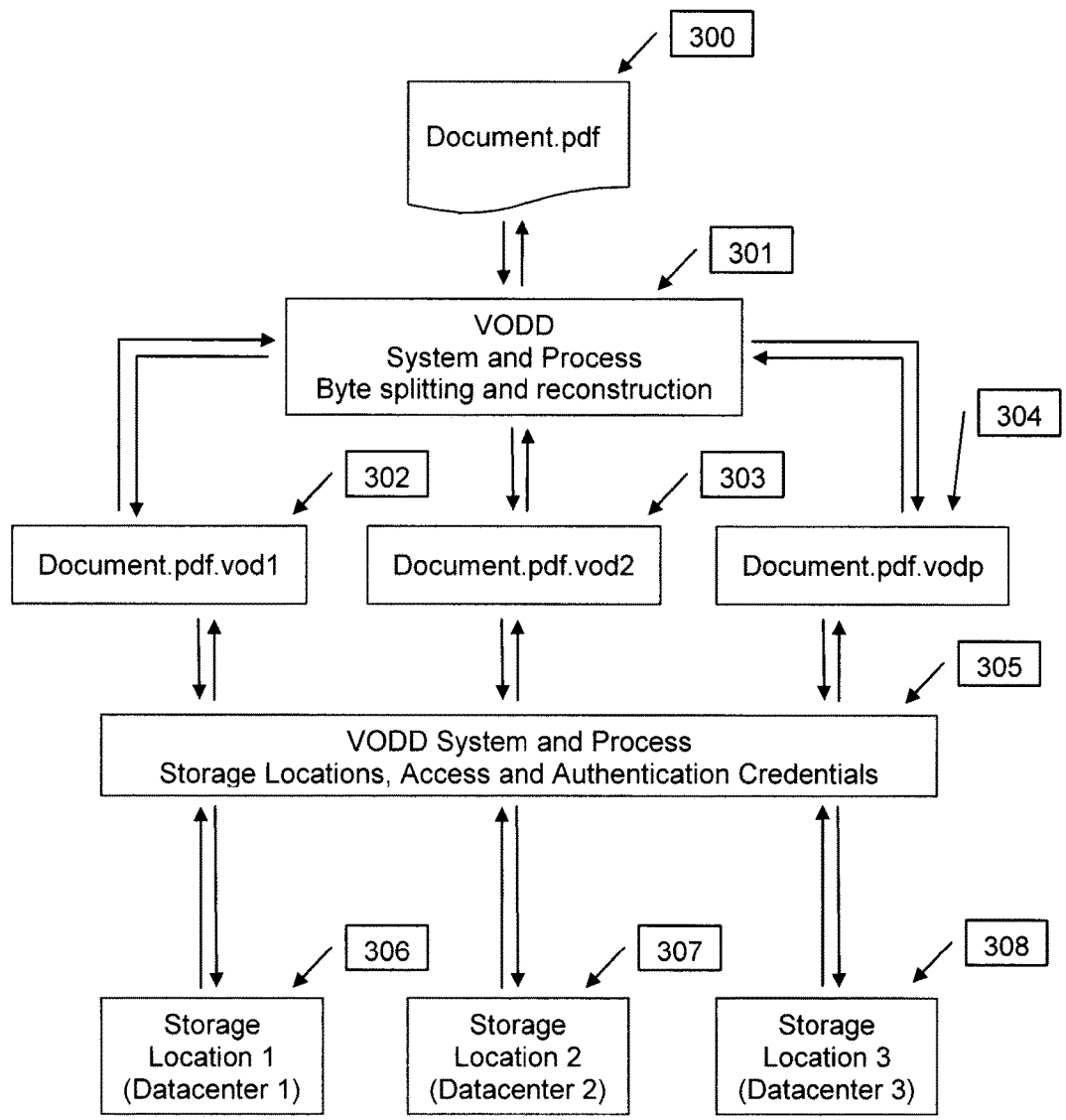
FIG. 3 shows an example of a source data file that is processed by an embodiment in accordance with the principles of the present invention, producing 3 output files that are sent to 3 different storage locations. It shows also the reverse process for reconstructing the source data file from those 3 files.

FIG. 3 shows an example of a source data file that is processed by one embodiment, producing 3 output files that are sent to 3 different storage locations. It shows also the reverse process for reconstructing the source data file from those 3 files.

In this example, file "Document.pdf" (300) is created by the user and sent to the VODD system for processing (301). The 3 files generated by the VODD system and process are "Document.pdf.vod1" (302), "Document.pdf.vod2" (303) and "Document.pdf.vodp" (304). It should be noted that the "vod1", "vod2" and "vodp" extensions used here are for illustrative purposes only and that other file extensions can be used. The storage location for each file, along with the access and authentication credentials are obtained from the VODD system and process (305). Each of these files is then sent to a different storage location (305 to 307). It is important to note that no single location has access to the source data, but only to meaningless data.

To access and read the source data file (300), the reverse process takes place and the files (302 to 304) in the different storage locations (306 to 308) are fetched and processed by the VODD system (301 and 305). In this example, we used a file called "Document.pdf", but it is important to note that any file or other data set can be processed by this embodiment of the method and system.

Figure 4:
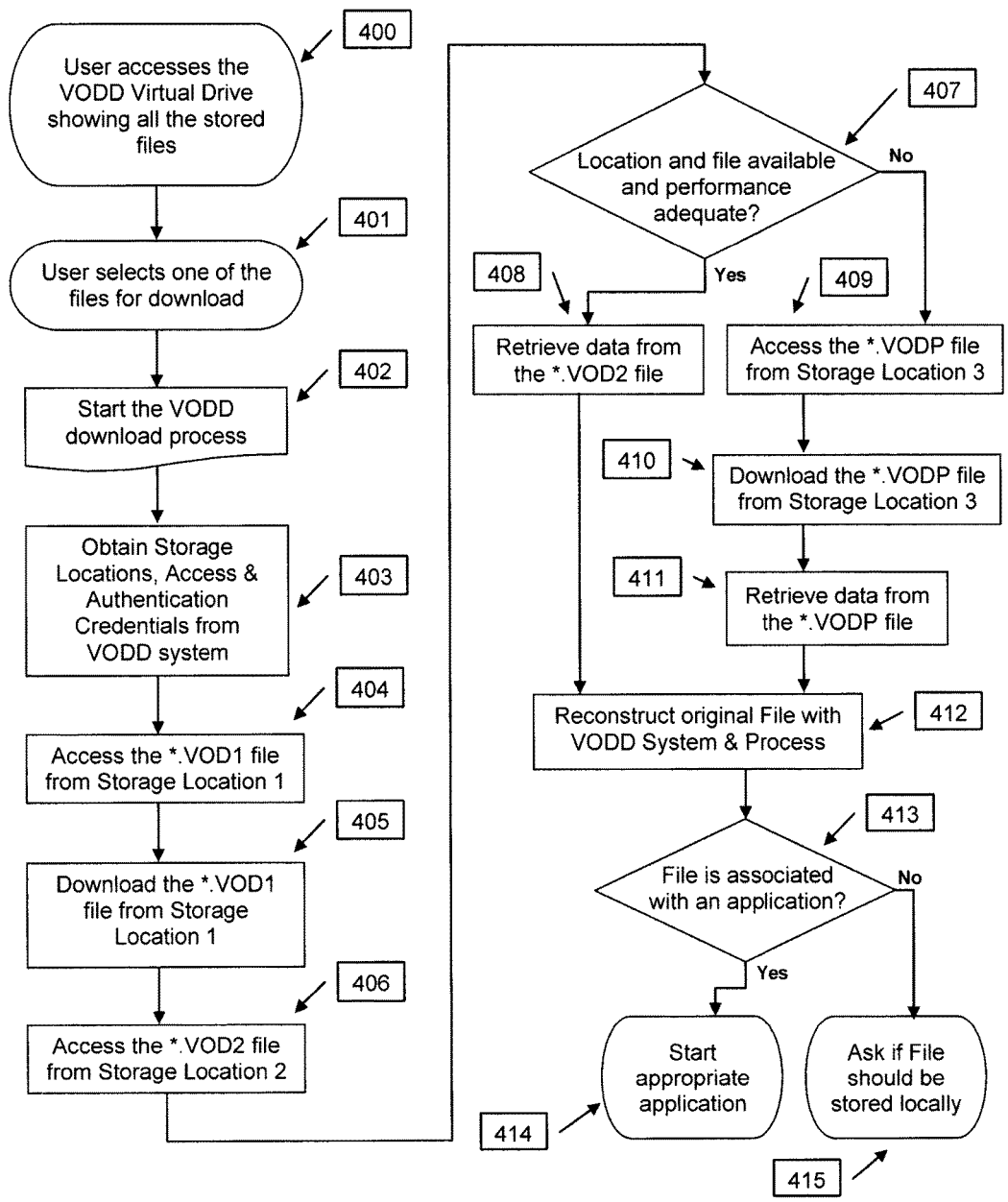
FIG. 4 is a diagram showing an embodiment of a method in accordance with the principles of the present invention for reconstructing the source data from the data slices and files, obtained from the different storage locations, from the moment the user or the organisation accesses one of the locations and opens *.VODx file.

FIG. 4 is a diagram showing an embodiment of the method for reconstructing the source data from the Data Slices and Parity File, obtained from the different storage locations, from the moment the user accesses the VODD Virtual Drive (400) and selects a file for download (401).

Once the file is selected, the VODD download process is started (402). The Storage Locations are obtained along with the access and authentication credentials (403). The *.VOD1 file is accessed from Storage Location 1 (404) and the *.VOD1 file is downloaded from Storage Location 1 (405). Then, the *.VOD2 file is accessed from Storage Location 2 (406).

The process then determines if Storage Location 2 and the *.VOD2 file are available and if the download performance is adequate (407). If Storage Location 2 and the *.VOD2 file are available, the Data Slice is retrieved from the *.VOD2 file (408). If Storage Location 2 is not available, if the *.VOD2 file is missing or corrupted, or if the download performance is inadequate, the *.VODP Parity File is accessed from Storage Location 3 (409). The *.VODP Parity File is downloaded from Storage Location 3 (410) and the Parity Data if retrieved from the *.VODP File (411). In both cases, the original source data File is reconstructed by the VODD system and process (412).

It should be noted that the same process would occur, and the source data File would be reconstructed with the *.VOD2 file and the *.VODP file, if the *.VOD1 file or Storage Location was not available or if performance was inadequate.

Finally, the process (413) determines if the source data File is associated with an application, in which case the appropriate application is started (414). If the source data File is not associated with an application, the user is asked to store the file locally (415). In this embodiment, we are referring specifically to a source data File, but the system can be embodied in a variety of systems to process any source data.

In FIG. 4, we use the minimum of two Data Files, one Parity File and 3 storage locations, but as will be shown below, the same general method and process also applies when more than two Data Files or more than one Parity File and more than 3 storage locations are used.

Figure 5:
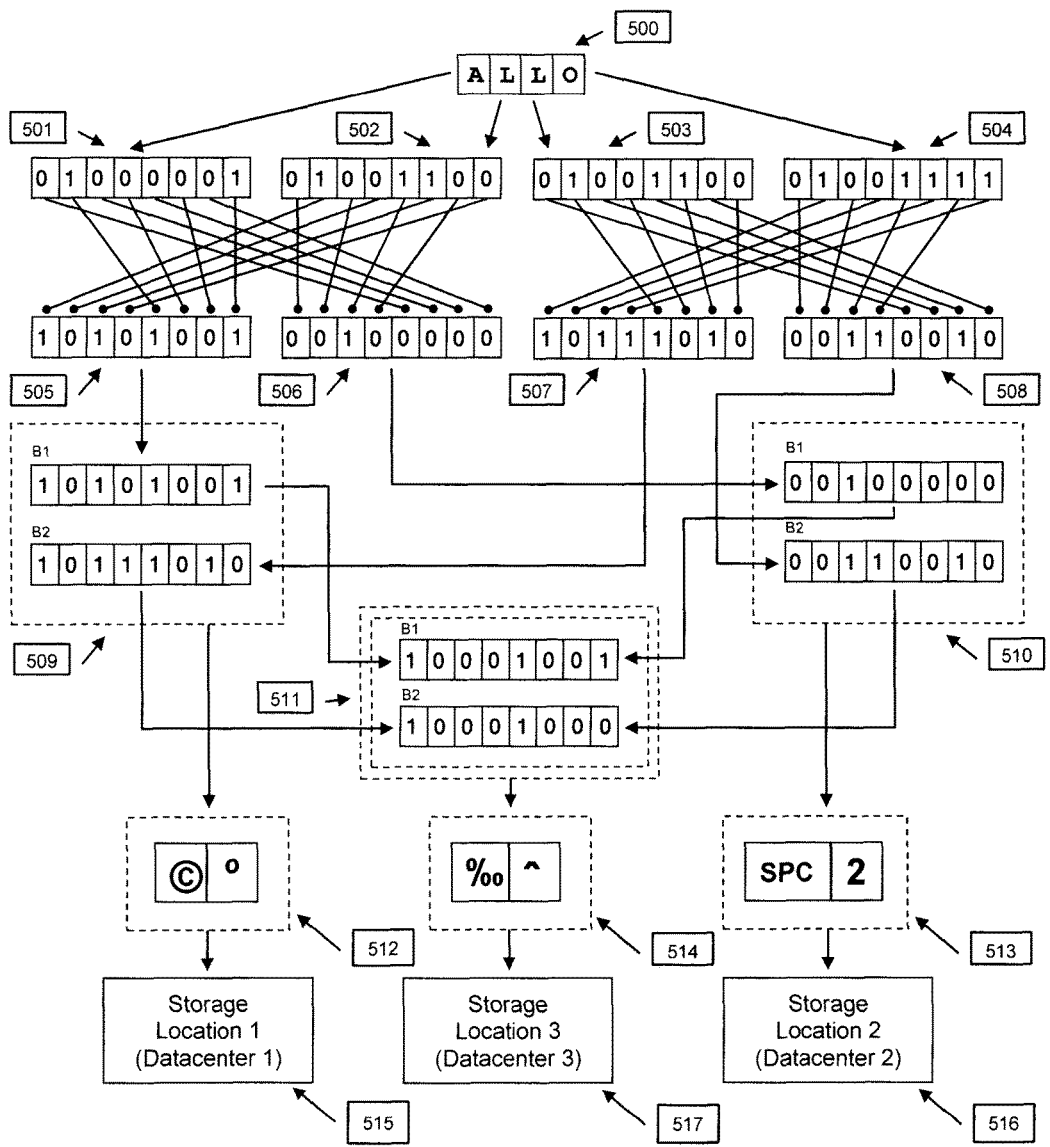
FIG. 5 is a diagram showing an embodiment of a method in accordance with the principles of the present invention for the data splitting process of source data into two data slices, the generation of a parity slice, conversion of the slices into meaningless files and sending these files to 3 different storage locations.

FIG. 5 is a diagram showing an embodiment of the process for the data fragmenting process details of source data (500) into two Data Slices (509 and 510), the generation of a Parity Slice (511), conversion of the 3 Slices into meaningless Files (512, 513 and 514) and sending these Files to different storage locations (515, 516 and 517), for a simple source data text file made-up of a 4-letter word (4 bytes), the word "ALLO" (500).

For simplicity, in this embodiment, we use the simplest odd/even bit sequencing order for the byte splitting process. The first pair of bytes for the source data file (501 and 502) is processed. Odd bits for each byte are combined logically to form a new byte (505). Even bits for each byte are also combined to form a new byte (506). The same process takes place for the next pair of bytes (503 and 504). Odd bits for each byte are combined logically to form a new byte (507). Even bits for each byte are also combined to form a new byte (508). The first new byte generated from each pair (505 and 507), containing the odd bits from the original 4 bytes (501 to 504), are combined to form Data Slice 1 (509), made up of $509_{B1}$ and $509_{B2}$. The second new byte generated from each pair (506 and 508), containing the even bits from the original 4 bytes (501 to 504), are combined to form Data Slice 2 (510), made up of $510_{B1}$ and $510_{B2}$. A logical [XOR] is then performed on each pair of corresponding bytes in each of the Data Slices ($509_{B1}$ [XOR] $510_{B1}$) and ($509_{B2}$ [XOR] $510_{B2}$) to form Parity Slice (511), made up of $511_{B1}$ and $511_{B2}$.

Three Files (512 to 514) are then generated from each of the 3 slices (509 to 511). One will note that the information that can be derived from each of these files is meaningless. The ASCII character displayed in each of the 3 Files (512 to 514) is equivalent to the binary values of each pair of bytes in each slice (509 to 511). The data obtained in each individual output file (512 to 513) therefore cannot be used to deduce in any way the original source information (500). Finally, each file (512 to 514) is sent to a different storage location (515 to 517). The original source data is never available nor is it accessible from any single storage location.

The method can also perform the reverse process, using the same logic, to reconstruct the source data (500), in our example the 4-letter word text file, from any two of the three output Files (512 to 514) stored in the 3 different locations (515 to 517). The Parity File (514) stored in Location 3 (517) is generally not required during normal operations, since the source data (500) can be reconstructed by the process from the two Data Files (512 and 513), stored in Locations 1 and 2 (515 and 516). If one of the Data Files (512 or 513) becomes unavailable or corrupted, or if one of the Data File locations (515 or 516) becomes unavailable or is too slow to respond, the source data (500) can be reconstructed by the process from the other Data File (512 or 513), obtained from one of the storage locations (515 or 516), and the Parity File (514) obtained from the parity storage location (517).

In this embodiment, since we are using an odd/even bit parsing and sequencing order to produce new pairs of bytes, we must ensure that the source data always contains an even number of bytes. To do so, the VODD process will always add a Null Byte (FIG. 2, box 201B) to the source Data File or Data Set if it is composed of an odd number of bytes.

The embodiment presented by the example in FIG. 5 used a very small file (4 bytes), a very simple (odd/even) bit sequence order, and generated the minimum of two Data Slices and one Parity Slice, converted into meaningless files and sent to 3 different storage locations. However, the embodiment presented does not limit the type and size of source data that can be processed, the bit sequencing order, the number of Data Slices and Parity Slices, the number of Data Files and Parity Files that can be generated, nor the number and type of storage locations that can be used.

Figure 6:
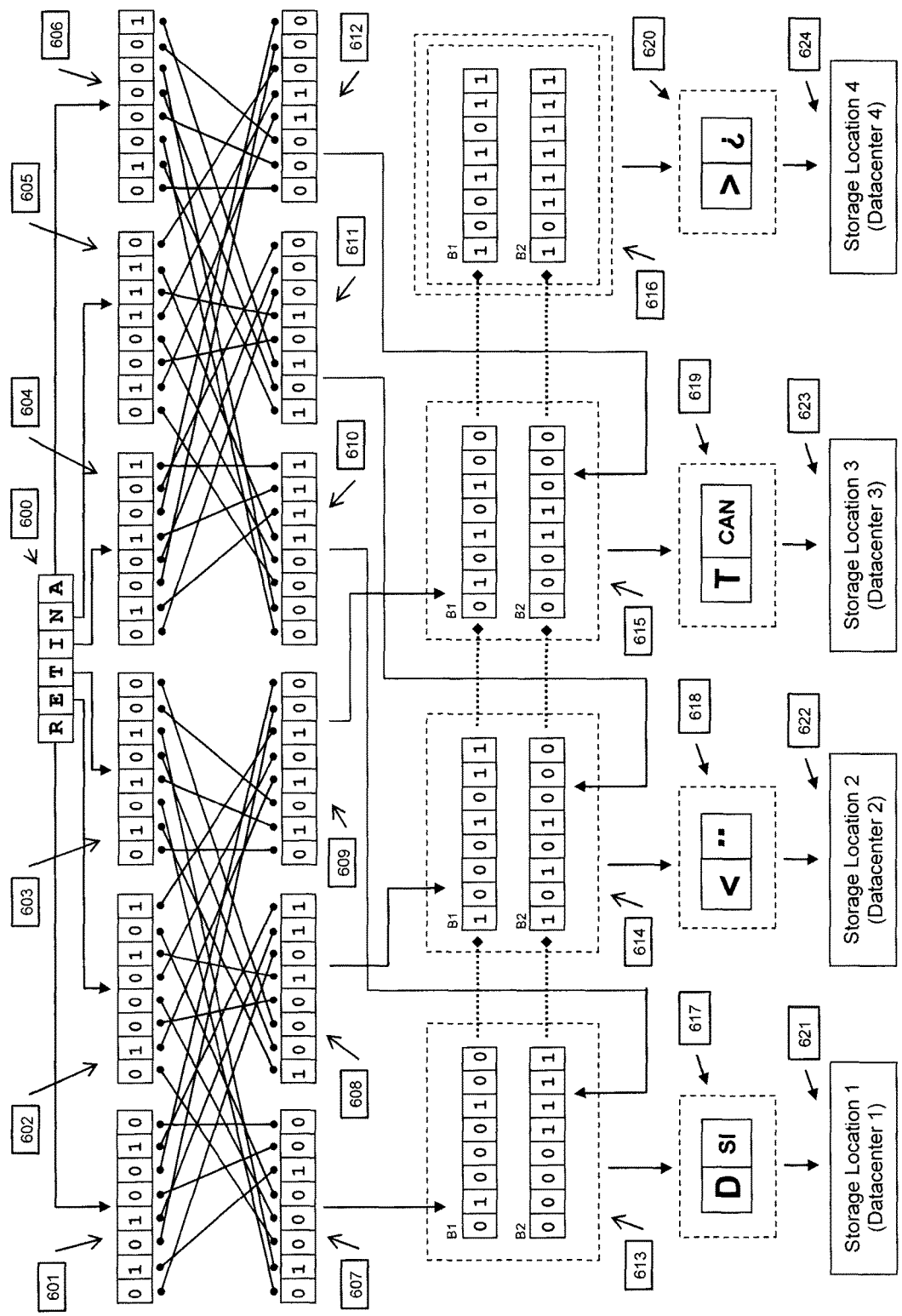
FIG. 6 is a diagram showing an embodiment of a method in accordance with the principles of the present invention for the data splitting process of source data into 3 data slices, the generation of a parity slice, conversion of the slices into meaningless files and sending these files to 4 different storage locations.

FIG. 6 is a diagram showing an embodiment of the process for the data fragmenting process details of source data (600) into three Data Slices (613, 614 and 615), the generation of a Parity Slice (616), conversion of the 4 Slices into meaningless Files (617, 618, 619 and 620) and sending these Files to different storage locations (621, 622, 623 and 624), for a simple source data text file made-up of a 6-letter word (6 bytes), the word "RETINA" (600).

For simplicity, in this embodiment, we use the simplest odd/even/odd bit sequencing order for the byte splitting process. The first trio of bytes for the source data file (601, 602 and 603) are processed. The odd/even/odd sequence of bits for the three bytes is parsed and combined logically to form three new bytes (607, 608 and 609). The same process takes place for the next trio of bytes (604, 605 and 606). The odd/even/odd sequence of bits for the three bytes is parsed and combined logically to form three new bytes (610, 611 and 612). The first new byte generated from each trio (607 and 610), containing the odd/even/odd parsed bits from the original 6 bytes (601 to 606), are combined to form Data Slice 1 (613), made up of $613_{B1}$ and $613_{B2}$. The second new byte generated from each trio (608 and 611), containing the second set of odd/even/odd parsed bits from the original 6 bytes (601 to 606), are combined to form Data Slice 2 (614), made up of $614_{B1}$ and $614_{B2}$. The third new byte generated from each trio (609 and 612), containing the third set of odd/even/odd parsed bits from the original 6 bytes (601 to 606), are combined to form Data Slice 3 (615), made up of $615_{B1}$ and $615_{B2}$.

A logical [XOR] is then performed on each pair of corresponding bytes in each of the Data Slices ($613_{B1}$ [XOR] $614_{B1}$ [XOR] $615_{B1}$) and ($613_{B2}$ [XOR] $614_{B2}$ [XOR] $615_{B2}$) to form Parity Slice (616), made up of $616_{B1}$ and $616_{B2}$.

Four Files (617, 618, 619 and 620) are then generated from each of the 4 slices (613, 614, 615 and 616). One will note that the information that can be derived from each of these files is meaningless. The ASCII character displayed in each of the 4 Files (617 to 620) is equivalent to the binary values of each pair of bytes in each slice (613 to 616). The data obtained in each individual output file (617 to 620) therefore cannot be used to deduce in any way the original source information (600). Finally, each file (617 to 620) is sent to a different storage location (621 to 624). The original source data is never available nor is it accessible from any single storage location.

The method can also perform the reverse process, using the same logic, to reconstruct the source data (600), in our example the 6-letter word text file, from any three (3) of the four (4) output Files (617 to 620) stored in the 4 different locations (621 to 624). The Parity File (620) stored in Location 4 (624) is generally not required during normal operations, since the source data (600) can be reconstructed by the process from the three Data Files (617, 618 and 619), stored in Locations 1, 2 and 3 (621, 622 and 623). If one of the Data Files (617, 618 or 619) becomes unavailable or corrupted, or if one of the Data File locations (621, 622 or 623) becomes unavailable or is too slow to respond, the source data (600) can be reconstructed by the process from the other two Data File (617 and 618, 618 and 619, or 617 and 619), obtained from one of the storage locations (621 and 622, 622 and 623, or 621 and 623), and the Parity File (620) obtained from the parity storage location (624).

In this embodiment, since we are using an odd/even/odd bit parsing and sequencing order to produce new trios of bytes, we must ensure that the source data always contains a number of bytes that is a multiple of 3. To do so, the VODD process will always add one or two Null Bytes (FIG. 2, box 201B) to the source Data File or Data Set if it is composed of a number of bytes that is not a multiple of 3.

The embodiment presented by the example in FIG. 6 used a very small file (6 bytes), a very simple (odd/even/odd) bit sequence order, and generated three (3) Data Slices and one (1) Parity Slice, converted into meaningless files and sent to four (4) different storage locations. However, the embodiment presented does not limit the type and size of source data that can be processed, the bit sequencing order, the number of Data Slices and Parity Slices, the number of Data Files and Parity Files that can be generated, nor the number and type of storage locations that can be used.

Figure 7:
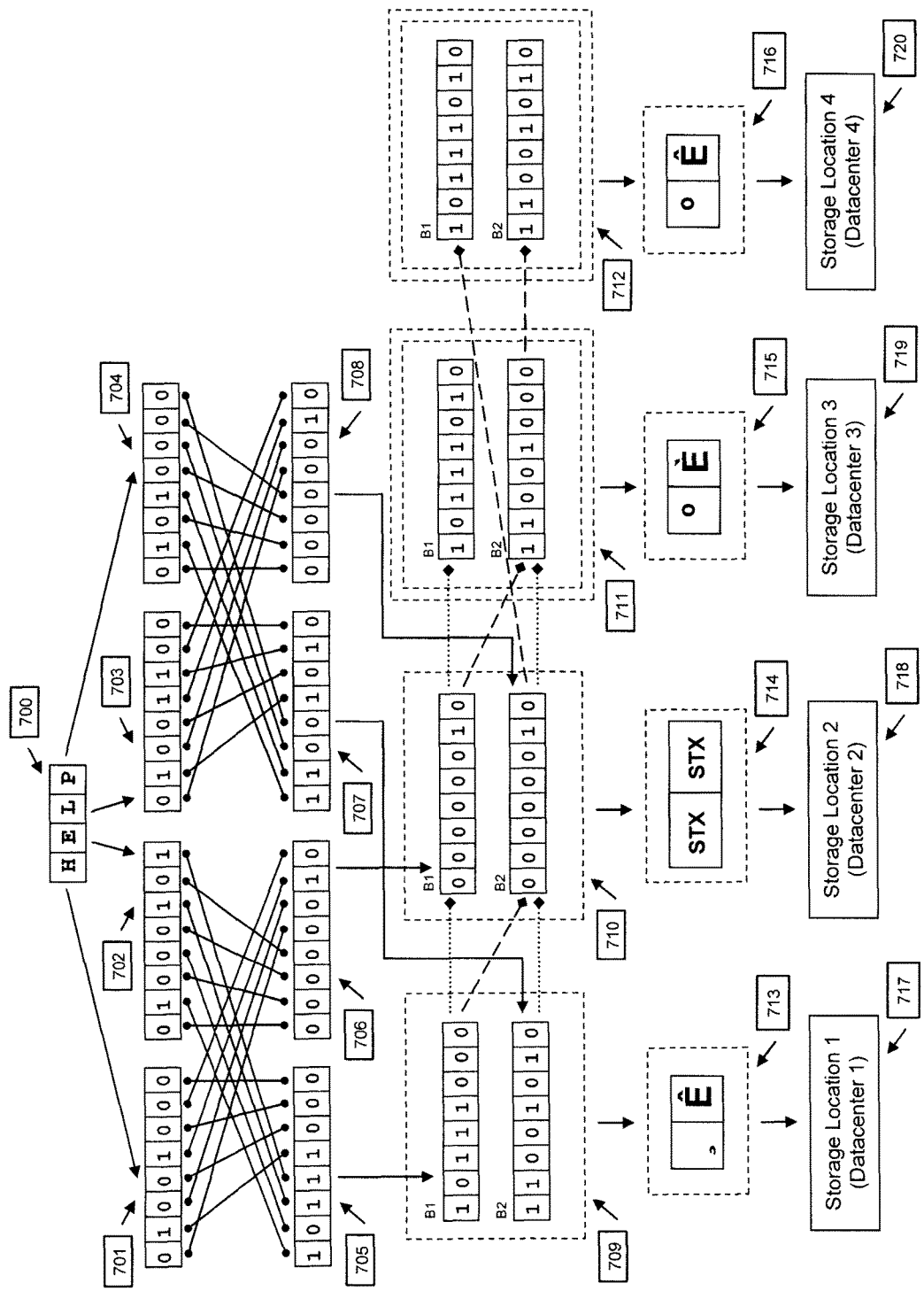
FIG. 7 is a diagram showing an embodiment of a method in accordance with the principles of the present invention for the data splitting process of source data into two data slices, the generation of a parity slice and a double parity slice, conversion of the slices into meaningless files and sending these files to 4 different storage locations.

FIG. 7 is a diagram showing an embodiment of the process for the data fragmenting process details of source data (700) into two Data Slices (709 and 710), the generation of a Parity Slice (711), the generation of a Double Parity Slice (712), conversion of the 4 Slices into meaningless Files (713, 714, 715 and 716) and sending these Files to different storage locations (717, 718, 719 and 720), for a simple source data text file made-up of a 4-letter word (4 bytes), the word "HELP" (700).

For simplicity, in this embodiment, we use the simplest odd/even bit sequencing order for the byte splitting process. The first pair of bytes for the source data file (701 and 702) is processed. Odd bits for each byte are parsed and combined logically to form a new byte (705). Even bits for each byte are also parsed and combined to form a new byte (706). The same process takes place for the next pair of bytes (703 and 704). Odd bits for each byte are parsed and combined logically to form a new byte (707). Even bits for each byte are also parsed and combined to form a new byte (708). The first new byte generated from each pair (705 and 707), containing the odd bits from the original 4 bytes (701 to 704), are combined to form Data Slice 1 (709). The second new byte generated from each pair (706 and 708), containing the even bits from the original 4 bytes (701 to 704), are combined to form Data Slice 2 (710).

A logical [XOR] is then performed on each pair of corresponding bytes in each of the Data Slices ($709_{B1}$ [XOR] $710_{B1}$) and ($709_{B2}$ [XOR] $710_{B2}$) to form Parity Slice (711) made up of ($711_{B1}$) and ($711_{B2}$). A logical [XOR] is also performed on each pair of corresponding bytes in each of the Data Slices and the Parity Slice ($709_{B1}$ [XOR] $710_{B2}$) and ($710_{B1}$ [XOR] $711_{B2}$) to form a Double Parity Slice (712) made up of ($712_{B1}$) and ($712_{B2}$).

Four Files (713, 714, 715 and 716) are then generated from each of the 4 slices (709, 710, 711 and 712). One will note that the information that can be derived from each of these files is meaningless. The ASCII character displayed in each of the 4 Files (713 to 716) is equivalent to the binary values of each pair of bytes in each slice (709 to 712). The data obtained in each individual output file (713 to 716) therefore cannot be used to deduce in any way the original source information (700). Finally, each file (713 to 716) is sent to a different storage location (717 to 720). The original source data is never available nor is it accessible from any single storage location.

Understandingly, the reverse process can be performed using the same logic, to reconstruct the source data (700), in our example the 4-letter word text file, from any two of the four output Files (713 to 716) stored in the 4 different locations (717 to 720). The Parity File (715) stored in Location 3 (719), and Double Parity File (716) stored in Location 4 (720), are generally not required during normal operations, since the source data (700) can be reconstructed by the process from the two Data Files (713 and 714), stored in Locations 1 and 2 (717 and 718).

If one of the Data Files (713 or 714) becomes unavailable or corrupted, or if one of the Data File locations (717 or 718) becomes unavailable or is too slow to respond, the source data (700) can be reconstructed by the process from the other Data File (713 or 714), obtained from one of the storage locations (717 or 718), and the Parity File (715) obtained from the parity storage location (719).

If both Data Files (713 and 714) become unavailable or corrupted, or if both Data File locations (717 and 718) become unavailable or are too slow to respond, the source data (700) can be reconstructed by the process from the Parity File (715), obtained from storage location (719), and the Double Parity File (716), obtained from storage location (720). Reconstruction of the source data (700) when two of the 4 Storage Locations or two of the 4 Data Files become unavailable or corrupted or are too slow to respond is not obvious at first glance. The reconstruction process therefore can be summarized as follows:

Reconstruction of Source Data (700) if both Storage Location 1 (717), or Data File 1 (713), and Storage Location 2 (718), or Data File 2 (714), become unavailable, corrupted or too slow to respond:

$710_{B1}=711_{B2}$ [XOR] $712_{B2}$
$709_{B1}=710_{B1}$ [XOR] $711_{B1}$
$710_{B2}=709_{B1}$ [XOR] $712_{B1}$
$709_{B2}=710_{B2}$ [XOR] $711_{B2}$

Reconstruction of Source Data (700) if both Storage Location 1 (717), or Data File 1 (713), and Storage Location 3 (719), or Parity File (715), become unavailable, corrupted or too slow to respond:

$709_{B1}=710_{B2}$ [XOR] $712_{B1}$
$711_{B2}=710_{B1}$ [XOR] $712_{B2}$
$709_{B2}=710_{B2}$ [XOR] $711_{B2}$

Reconstruction of Source Data (700) if both Storage Location 2 (718), or Data File 2 (714), and Storage Location 3 (719), or Parity File (715), become unavailable, corrupted or too slow to respond:

$710_{B2}=709_{B1}$ [XOR] $712_{B1}$
$711_{B2}=709_{B2}$ [XOR] $710_{B2}$
$710_{B1}=711_{B2}$ [XOR] $712_{B2}$

In this embodiment, since we are using an odd/even bit parsing and sequencing order to produce new pairs of bytes, we must ensure that the source data always contains an even number of bytes. To do so, the VODD process will always add a Null Byte (FIG. 2, box 201B) to the source Data File or Data Set if it is composed of an odd number of bytes.

The embodiment presented by the example in FIG. 7 used a very small file (4 bytes), a very simple (odd/even) bit sequence order, and generated the minimum of two Data Slices and two Parity Slices, converted into meaningless files and sent to 4 different storage locations. However, the embodiment presented does not limit the type and size of source data that can be processed, the bit sequencing order, the number of Data Slices and Parity Slices, the number of Data Files and Parity Files that can be generated, nor the number and type of storage locations that can be used.

Though the present system and method for partitioning and storing data in different data storage locations generally do not require additional encryption, the original data file or source data and/or the various data slices and parity slices generated by the present system and method could be further encrypted for additional security, legal or compliance requirements.

Understandably, by partitioning the source data or file at the bit level and by storing the partitioned data or file at different data storage locations, the methods and related systems in accordance with the present invention provide a high level of information security (e.g. confidentiality, integrity and availability) at a minimal cost by making information available only where it is required and generally nowhere else.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computer-implemented method for partitioning a data set and storing data set parts at different data storage locations, the data set comprising a plurality of bytes, each of the bytes comprising a plurality of bits, the method comprising:
   a) for each pair of bytes in the data set:
      i) generating a first byte comprising a portion of the bits from one of the pair of bytes and a portion of the bits from the other of the pair of bytes, each of the portions of the bits being a predetermined sequence of bits ensuring that the first byte may not be used to determine the content of the data set;
      ii) generating a second byte comprising the remaining bits from the one of the pair of bytes, and the remaining bits from the other of the pair of bytes, each of the portions of the bits being a predetermined sequence of bits ensuring that the second byte may not be used to determine the content of the data set;
      iii) generating a parity byte from the first byte and the second byte;
   b) generating a first data set part from all the first bytes;
   c) generating a second data set part from all the second bytes;
   d) generating a parity part from all the parity bytes;
   e) storing the first data set part at a first data storage location;
   g) storing the second data set part at a second data storage location;
   h) storing the parity part at a third data storage location;
wherein all three locations are different from each other, and wherein, for each pair of bytes in the data set, the portion of the bits from the one of the pair of bytes comprises half the bits from the one of the pair of bytes, the portion of the bits from the other of the pair of bytes comprises half the bits from the other of the pair of bytes, the remaining bits from the one of the pair of bytes comprise the remaining half of the bits from the one of the pair of bytes, and the remaining bits from the other of the pair of bytes comprise the remaining half of the bits from the other of the pair of bytes.

2. A method as claimed in claim 1, wherein, for each pair of bytes in the data set, the half of the bits from the one of the pair of bytes comprises all odd bits from the one of the pair of bytes, the half of the bits from the other of the pair of bytes comprises all odd bits from the other of the pair of bytes, the remaining half of the bits from the one of the pair of bytes comprises all even bits from the one of the pair of bytes, and the remaining half of the bits from the other of the pair of bytes comprises all even bits from the other of the pair of bytes.

3. A computer-implemented system for partitioning a data set and storing data set parts at different data storage locations, the data set comprising a plurality of bytes, each of the bytes comprising a plurality of bits, the system comprising:
  a) at least one processor;
  b) for each pair of bytes in the data set:
    i) generating a first byte comprising a portion of the bits from one of the pair of bytes and a portion of the bits from the other of the pair of bytes, each of the portions of the bits being a predetermined sequence of bits ensuring that the first byte may not be used to determine the content of the data set;
    ii) generating a second byte comprising the remaining bits from the one of the pair of bytes, and the remaining bits from the other of the pair of bytes, each of the portions of the bits being a predetermined sequence of bits ensuring that the second byte may not be used to determine the content of the data set;
    iii) generating a parity byte from the first byte and the second byte;
  b) generating a first data set part from all the first bytes;
  c) generating a second data set part from all the second bytes;
  d) generating a parity part from all the parity bytes;
  e) storing the first data set part at a first data storage location;
  f) storing the second data set part at a second data storage location;
  g) storing the parity part at a third data storage location; wherein all three locations are different from each other, wherein for each pair of bytes in the data set, the portion of the bits from the one of the pair of bytes comprises half the bits from the one of the pair of bytes, the portion of the bits from the other of the pair of bytes comprises half the bits from the other of the pair of bytes, the remaining bits from the one of the pair of bytes comprise the remaining half of the bits from the one of the pair of bytes, and the remaining bits from the other of the pair of bytes comprise the remaining half of the bits from the other of the pair of bytes.

4. A system as claimed in claim 3, wherein, for each pair of bytes in the data set, the half of the bits from the one of the pair of bytes comprises all odd bits from the one of the pair of bytes, the half of the bits from the other of the pair of bytes comprises all odd bits from the other of the pair of bytes, the remaining half of the bits from the one of the pair of bytes comprises all even bits from the one of the pair of bytes, and the remaining half of the bits from the other of the pair of bytes comprises all even bits from the other of the pair of bytes.

* * * * *